(12) United States Patent
Williams et al.

(10) Patent No.: US 8,602,445 B2
(45) Date of Patent: Dec. 10, 2013

(54) ATTACHMENT CLIP

(71) Applicant: Chrysler Group LLC, Auburn Hills, MI (US)

(72) Inventors: Shawn R. Williams, Auburn Hills, MI (US); Joseph G. Lemmon, Chesterfield, MI (US); D. Scott Bittinger, Fenton, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/623,141

(22) Filed: Sep. 20, 2012

(65) Prior Publication Data

US 2013/0069345 A1    Mar. 21, 2013

Related U.S. Application Data

(60) Provisional application No. 61/537,308, filed on Sep. 21, 2011.

(51) Int. Cl.
    *B60R 21/16*    (2006.01)
(52) U.S. Cl.
    USPC ...................... 280/728.2; 280/730.2; 248/503
(58) Field of Classification Search
    USPC .............. 280/728.2, 730.2; 24/289, 291, 292, 24/295; 248/500, 501, 503
    See application file for complete search history.

(56) References Cited

U.S. PATENT DOCUMENTS

| | | | |
|---|---|---|---|
| 6,450,747 B1 * | 9/2002 | Fischer | 411/174 |
| 7,155,783 B2 * | 1/2007 | Nessel et al. | 24/289 |
| 7,290,795 B2 | 11/2007 | Kawai et al. | |
| 7,547,038 B2 * | 6/2009 | Coleman | 280/728.2 |
| 7,735,855 B2 | 6/2010 | Jang et al. | |
| 7,823,914 B2 * | 11/2010 | Cheal et al. | 280/730.2 |
| 2003/0042712 A1 * | 3/2003 | Henderson et al. | 280/728.2 |
| 2003/0222435 A1 * | 12/2003 | Schmidt et al. | 280/728.2 |
| 2004/0000775 A1 * | 1/2004 | Henderson et al. | 280/730.2 |
| 2005/0046154 A1 * | 3/2005 | Rhea et al. | 280/728.2 |
| 2006/0192368 A1 * | 8/2006 | Hall et al. | 280/730.2 |

* cited by examiner

*Primary Examiner* — Toan To
(74) *Attorney, Agent, or Firm* — Frederick A. Krieger

(57) ABSTRACT

An attachment clip for coupling an airbag to a motor vehicle is provided. The clip can include a first leg having a first aperture, a second aperture and a protrusion extending from an edge of the second aperture in an outward direction from the first leg. The clip can include a second leg spaced from the first leg and coupled to the first leg. The second leg has a threaded aperture substantially coaxial with the first aperture of the first leg. The space between the first and second legs can slidably receive a mounting member and a portion of the airbag. The protrusion can engage the portion of the airbag, and a fastener can extend through the first aperture of the first leg, through the portion of the airbag and through the mounting member to engage the threaded aperture of the second leg for attaching the airbag to the vehicle.

14 Claims, 2 Drawing Sheets

ATTACHMENT CLIP

CROSS-REFERENCE TO RELATED APPLICATION

This application claims the benefit of U.S. Provisional Ser. No. 61/537,308, filed Sep. 21, 2011.

FIELD

The present teachings relate to vehicle safety systems, and more particularly to an attachment clip, which can be used with an airbag.

BACKGROUND

Many modern vehicles employ airbag systems as a form of passenger restraint. Typically, airbags serve to absorb the kinetic energy of a passenger generated during an impact event by inflating into a surface operable to contact the passenger to absorb the passenger's kinetic energy. Generally, airbag systems are positioned in various locations throughout the vehicle, such as the dashboard, steering wheel, sidewall of the passenger seat and the headliner. These airbag systems are usually hidden from view by various trim components. In certain instances, it can be desirable for the airbag to be secured to the motor vehicle via one or more clips.

SUMMARY

According to various embodiments, provided is an attachment clip for coupling an airbag to a motor vehicle. The attachment clip can include a first leg having a first aperture, a second aperture and a protrusion extending from an edge of the second aperture in an outward direction from the first leg. The attachment clip can include a second leg spaced from the first leg and coupled to the first leg. The second leg can have a threaded aperture substantially coaxial with the first aperture of the first leg. The space between the first and second legs can be configured to slidably receive a mounting member and a portion of the airbag. The protrusion can engage the portion of the airbag, and a fastener can extend through the first aperture of the first leg, through the portion of the airbag and through the mounting member to engage the threaded aperture of the second leg for attaching the airbag to the vehicle.

Also provided is an attachment clip for coupling an airbag to a motor vehicle. The attachment clip can include a first portion defining a longitudinal axis and including a first wing, a second wing and a first bore extending along a first axis substantially perpendicular to the longitudinal axis. The first wing and the second wing can each have a projection that extends along a second axis transverse to the longitudinal axis. The projection of the first wing and the second wing can be positionable through a portion of an airbag for securing the airbag to the attachment clip. The attachment clip can include a second portion opposite the first portion and extending parallel to the first portion. The second portion can have a second bore extending along a third axis. The third axis can be substantially coaxial with the first axis, and the second bore can have a plurality of threads. The attachment clip can include a sidewall that couples the first portion to the second portion such that the first portion is spaced a distance apart from the second portion. The attachment clip can also include a fastener receivable through the first bore and threadably engagable with the plurality of threads of the second bore to couple the attachment clip to the motor vehicle.

Further areas of applicability of the present disclosure will become apparent from the detailed description, drawings and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

In the present disclosure, various exemplary embodiments of an attachment clip are provided for coupling an airbag to a motor vehicle. The attachment clip can include a first leg having a first aperture, a second aperture and a protrusion extending from an edge of the second aperture in an outward direction from the first leg. The attachment clip can include a second leg spaced from the first leg and coupled to the first leg. The second leg can have a threaded aperture substantially coaxial with the first aperture of the first leg. The space between the first and second legs can be configured to slidably receive a mounting member and a portion of the airbag. The protrusion can engage the portion of the airbag, and a fastener can extend through the first aperture of the first leg, through the portion of the airbag and through the mounting member to engage the threaded aperture of the second leg for attaching the airbag to the vehicle.

Figure 1:
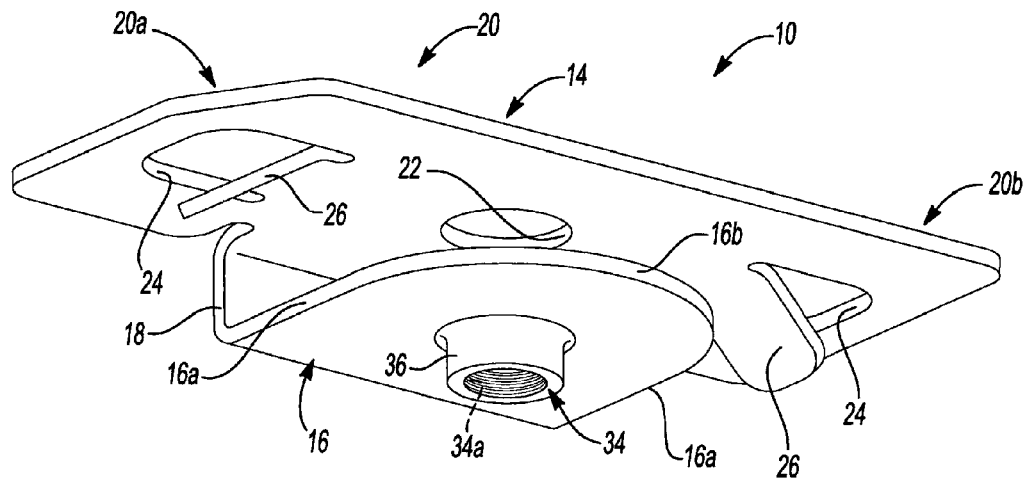
FIG. 1 is a perspective view of an attachment clip for use with an airbag according to an exemplary embodiment of the present disclosure.
Figure 2:
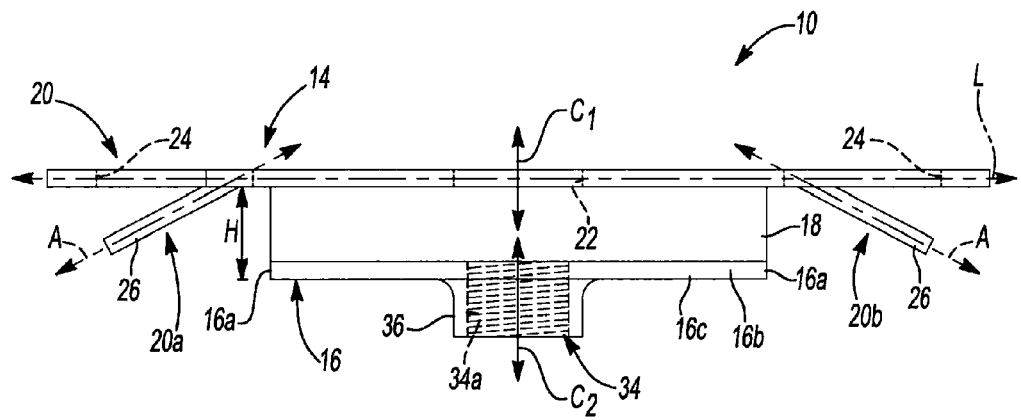
FIG. 2 is a side view of the attachment clip of FIG. 1.

With reference to FIGS. 1-4, an exemplary embodiment of an attachment clip 10 is shown. The attachment clip 10 can be used to secure an airbag 12 to a motor vehicle (FIG. 4), as will be discussed in greater detail herein. With reference to FIGS. 1 and 2, the attachment clip 10 can include a first leg or top portion 14 and a second leg or bottom portion 16, which can be interconnected by a sidewall 18. The top portion 14 and bottom portion 16 can be substantially planar, and can cooperate to define a hook coupleable to a motor vehicle. The attachment clip 10 can be composed of a suitable metal, such as steel, or a high-strength plastic. The attachment clip 10 can be formed by extruding the attachment clip 10 and folding the attachment clip 10 to form the bottom portion 16, but other suitable techniques could be used to form the attachment clip 10. For example, the attachment clip 10 can be formed by stamping, machining, etc.

In an exemplary embodiment, the top portion 14 can be positioned generally opposite the bottom portion 16 and can be generally parallel to the bottom portion 16. The top portion 14 can include at least one wing 20, a first aperture or through-bore 22 and at least one notch 23. In one example, the at least one wing 20 can include a first wing 20*a* and a second wing 20*b*. The first wing 20*a* and the second wing 20*b* can be defined on opposed sides of the first leg or top portion 14. In one embodiment, the first wing 20*a*, the second wing 20*b* and the top portion 14 distribute the load of the airbag 12 over a larger area, and can assist in coupling the airbag 12 to the motor vehicle, as will be discussed in greater detail herein. Each of the first wing 20a and the second wing 20b can include an aperture 24 and a protrusion or projection 26. Additionally, if desired, one of the first wing 20a and the second wing 20b can include a feature, such as a tapered edge, which can assist in proper orientation of the attachment clip 10.

Figure 3:
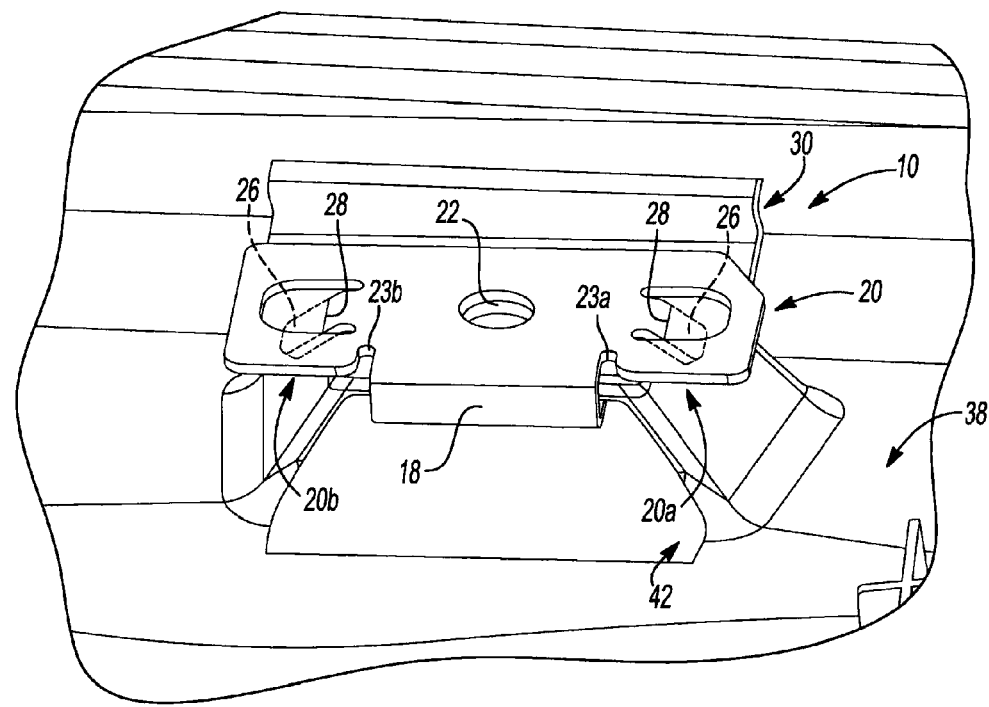
FIG. 3 is a view of the attachment clip of FIG. 1 coupling an airbag to a portion of a motor vehicle.

The aperture 24 can cooperate with the projection 26 to assist in coupling the airbag 12 to the attachment clip 10, and thus, to the motor vehicle, as will be discussed herein. In an exemplary embodiment, the projection 26 can extend generally over the aperture 24. In one example, the projection 26 can extend from an edge of the aperture 24 in an outward direction toward the second leg 16. With reference to FIG. 3, the projection 26 can be received within an aperture 28 defined in a strap 30 associated with the airbag 12 to further couple the airbag 12 to the attachment clip 10. With reference to FIG. 2, in one example, the projection 26 can extend along an axis A transverse to a longitudinal axis L defined by the top portion 14 to assist in coupling the projection 26 to the airbag 12. It should be noted that the projection 26 could extend in a direction substantially parallel to the longitudinal axis L, if desired, and thus, the axis A is merely exemplary.

Figure 4:
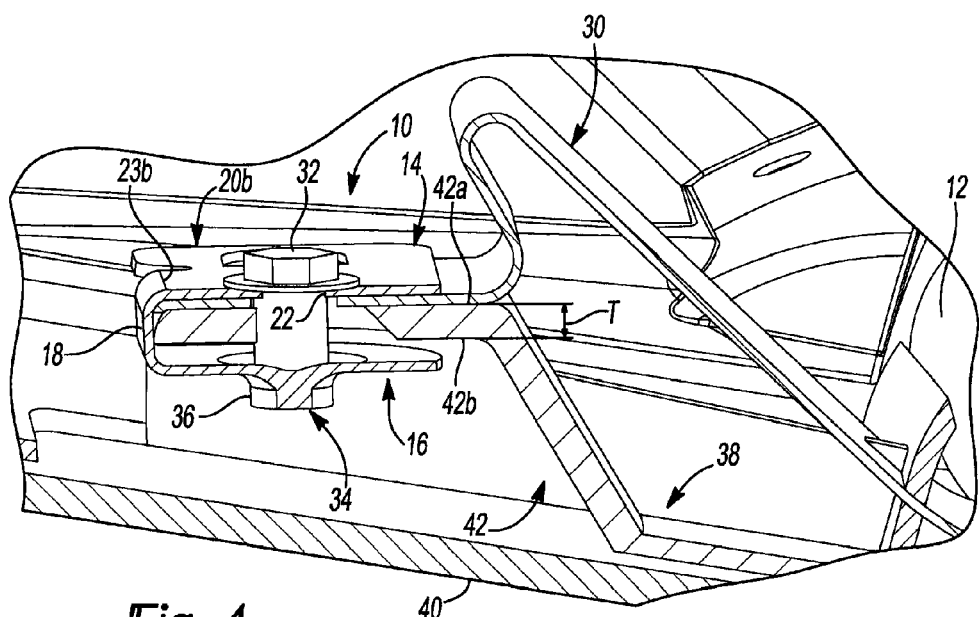
FIG. 4 is a cross-sectional view of the attachment clip coupling an airbag to a portion of a motor vehicle taken along line 4-4 of FIG. 3.

The throughbore 22 can be defined through the top portion 14. The throughbore 22 can be sized to enable a fastener 32 to pass therethrough (FIG. 4). With reference to FIG. 2, the throughbore 22 can be formed about a central axis C1. The central axis C1 can be coaxially aligned with a central axis C2 of an aperture or bore 34 of the bottom portion 16. The at least one notch 23 can comprise a first notch 23a and a second notch 23b. The first notch 23a and the second notch 23b can be positioned adjacent to the sidewall 18 and can enable the bottom portion 16 to be bent relative to the top portion 14 about the sidewall 18.

With reference to FIG. 2, the bottom portion 16 can be opposite the top portion 14 and can extend generally parallel to the top portion 14. The bottom portion 16 can include the bore 34 and an extrusion 36. The bottom portion 16 can be arcuate in shape and can be smaller in size than the top portion 14. With reference to FIG. 1, the bottom portion 16 can have opposed generally planar sides 16a coupled together via a curved portion 16b. The generally planar sides 16a and the curved portion 16b can facilitate engagement of the attachment clip 10 with the motor vehicle, as will be discussed in greater detail herein.

The bore 34 can be configured to receive the fastener 32 (FIG. 4). In one example, with reference to FIG. 2, the bore 34 can include a plurality of threads 34a. It should be noted, however, that the bore 34 need not include the plurality of threads 34a, as the bore 34 could be smooth to receive a self-tapping fastener. Alternatively, the bore 34 could be smooth to enable a fastener to pass through and mate with a nut or other fastening mechanism. The bore 34 can extend through the extrusion 36.

The extrusion 36 can extend outwardly from a distalmost surface 16c of the bottom portion 16. The extrusion 36 can be generally conical or cylindrical in shape, however, any suitable shape could be employed. The extrusion 36 can extend the length of the bore 34 to enable the bore 34 to threadably receive the fastener 32. Thus, the extrusion 36 can define a portion of the bore 34. It should be noted that the extrusion 36 is merely exemplary, as a nut could be used to couple the fastener 32 to the attachment clip 10.

With reference to FIG. 2, the sidewall 18 can couple the top portion 14 to the bottom portion 16. The sidewall 18 can have a height H, which can be selected to enable the attachment clip 10 to be coupled to a portion of the motor vehicle. Generally, the sidewall 18 can be sized to create a space between the top portion 14 and bottom portion 16, which can enable a mounting member and portion of the airbag 12 to be slidably received within the space. In one example, with reference to FIGS. 3 and 4, the attachment clip 10 can be coupled to a carrier 38 secured to a headliner 40 (FIG. 4) of the motor vehicle. As the carrier 38 and headliner 40 can comprise those disclosed in commonly owned U.S. patent application Ser. No. 13/623,544, filed on Sep. 20, 2012 and entitled "Interior Roof Module", which is incorporated herein by reference, the carrier 38 and headliner 40 will not be discussed in great detail herein.

Briefly, however, the carrier 38 can include a mounting member or bracket 42. With reference to FIG. 4, the bracket 42 can have a thickness T. The height H of the attachment clip 10 can be sized to enable the attachment clip 10 to hook onto the bracket 42 so that the top portion 14 is adjacent to a first surface 42a of the bracket 42 and the bottom portion 16 is adjacent to a second surface 42b of the bracket 42. The bracket 42 can also include a bore, which can enable the fastener 32 to pass through the first portion 14 into the second portion 16 to couple the attachment clip 10 to the bracket 42. It should be noted that although the attachment clip 10 is described and illustrated herein as being used with the carrier 38, the attachment clip 10 could also be sewn into the airbag 12 and used to couple the airbag 12 directly to a body-in-white of a motor vehicle, if desired.

Thus, the attachment clip 10 can be used to couple an airbag 12, such as a side impact airbag, to headliner 40 of the motor vehicle (FIG. 4). With reference to FIG. 3, the projections 26 of the first wing 20a and the second wing 20b can be received within the apertures 28 defined in the strap 30 associated with the airbag 12. Then, the attachment clip 10 can be coupled to the bracket 42, with the top portion 14 adjacent to a first surface 42a of the bracket 42 and the bottom portion 16 adjacent to a second surface 42b of the bracket 42 (FIG. 3). The fastener 32 can be inserted into the throughbore 22, through the bracket 42, and threadably engaged with the plurality of threads 34a of the bore 34 of the bottom portion 16 to secure the attachment clip 10 and airbag 12 to the carrier 38.

In use, the attachment clip 10 can act as a load carrying plate and can distribute the load of the airbag 12 over a larger portion of the carrier 38. The use of the attachment clip 10 can provide reinforcement to the airbag 12, while coupling the airbag 12 to the carrier 38. The use of a single attachment clip 10 for reinforcement and attachment of the airbag 12 can improve performance, reduce cost and reduce the number of assembly operations. The attachment clip 10 in combination with the bracket 42 can significantly increase load carrying capability for the airbag 12. In one example, the attachment clip 10 can have a pull-out force of greater than 250 pounds (lbs) when coupled to the motor vehicle. The use of the attachment clip 10, which can hook onto the bracket 42, can also reduce assembly time associated with coupling the airbag 12 to the motor vehicle. In addition, the attachment clip 10 could be utilized to hook onto a side rail of a body in white of the motor vehicle to mount the airbag 12 and increase load capability, while reducing cost and operations when compared to traditional side rail airbag mounting features.

What is claimed is:

1. An attachment clip for coupling an airbag to a motor vehicle, the clip comprising:
   a first leg having a first aperture, a second aperture and a protrusion extending from an edge of the second aperture in an outward direction from the first leg;

a second leg spaced from the first leg and coupled to the first leg, the second leg having a threaded aperture substantially coaxial with the first aperture of the first leg; and wherein the space between the first and second legs is configured to slidably receive a mounting member and a portion of the airbag, the protrusion engages the portion of the airbag, and a fastener extending through the first aperture of the first leg, through the portion of the airbag and through the mounting member to engage the threaded aperture of the second leg for attaching the airbag to the vehicle.

2. The attachment clip of claim 1, wherein the first leg further comprises a first wing and a second wing, and each of the first wing and the second wing include the second aperture and the protrusion.

3. The attachment clip of claim 1, wherein the first leg is generally parallel to the second leg.

4. The attachment clip of claim 1, wherein the second leg includes an extrusion extending from a surface, which defines a portion of the threaded aperture.

5. The attachment clip of claim 1, wherein the first leg and the second leg cooperate to define a hook coupleable to a motor vehicle.

6. The attachment clip of claim 5, wherein the motor vehicle includes a bracket, and the attachment clip is coupleable to the bracket with the fastener.

7. The attachment clip of claim 5, wherein the attachment clip has a pull-out force of over 250 pounds when coupled to the motor vehicle.

8. The attachment clip of claim 1, wherein the first leg and the second leg are each substantially planar.

9. The attachment clip of claim 1, further comprising a sidewall that couples the first leg to the second leg.

10. An attachment clip for coupling an airbag to a motor vehicle comprising:
a first portion defining a longitudinal axis and including a first wing, a second wing and a first bore extending along a first axis substantially perpendicular to the longitudinal axis, the first wing and the second wing each having a projection that extends along a second axis transverse to the longitudinal axis, the projection of the first wing and the second wing positionable through a portion of an airbag for securing the airbag to the attachment clip;
a second portion opposite the first portion and extending parallel to the first portion, the second portion having a second bore extending along a third axis, the third axis substantially coaxial with the first axis, the second bore having a plurality of threads;
a sidewall that couples the first portion to the second portion such that the first portion is spaced a distance apart from the second portion; and
a fastener receivable through the first bore and threadably engagable with the plurality of threads of the second bore to couple the attachment clip to the motor vehicle.

11. The attachment clip of claim 10, wherein the first portion and the second portion are each substantially planar.

12. The attachment clip of claim 10, wherein the motor vehicle includes a bracket, and the attachment clip is coupleable to the bracket with the fastener.

13. The attachment clip of claim 10, wherein the attachment clip has a pull-out force of over 250 pounds when coupled to the motor vehicle.

14. The attachment clip of claim 10, wherein the second portion includes an extrusion extending from a surface, which defines a portion of the second bore.

* * * * *